V. Haeffner.
Beer Cooler.
N° 37,443.    Patented Jan. 20, 1863.
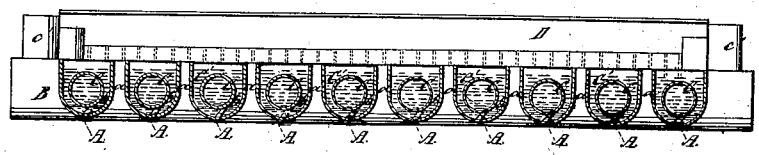
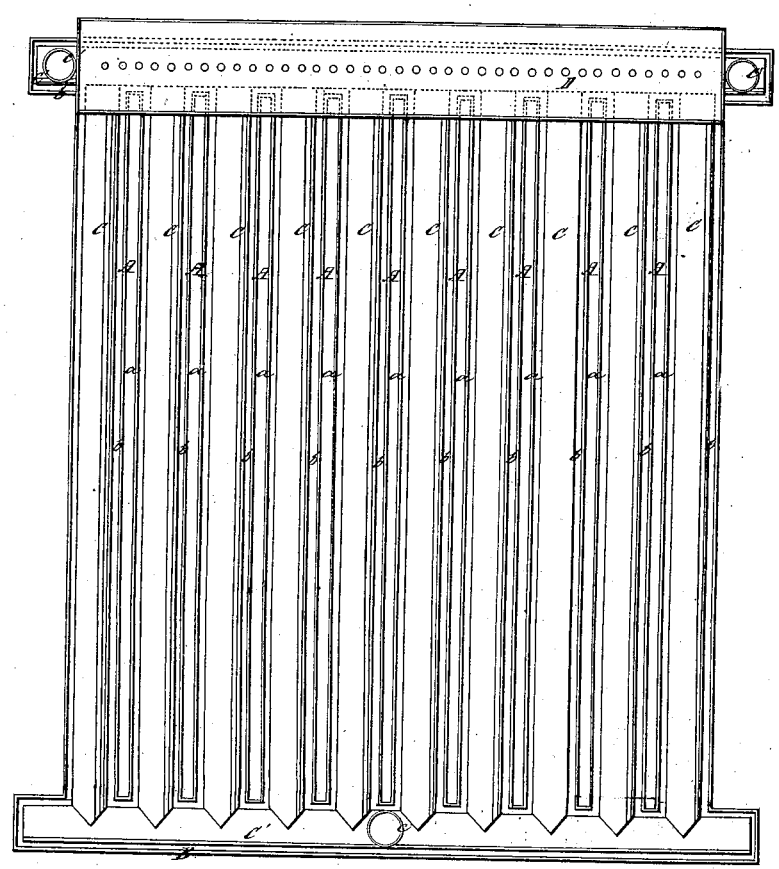
Witnesses
Timothy Shine
W. S. Partridge
Inventor
Valentin Haeffner

UNITED STATES PATENT OFFICE.

VALENTINE HAEFFNER, OF DOBB'S FERRY, NEW YORK.

IMPROVED BEER-COOLER.

Specification forming part of Letters Patent No. 37,443, dated January 20, 1863.

*To all whom it may concern:*

Be it known that I, VALENTINE HAEFFNER, of Dobb's Ferry, in the county of Westchester and State of New York, have invented a new and Improved Beer-Cooler; and I do hereby declare that the following is a full, clear, and exact description of the same, reference being had to the accompanying drawings, forming a part of this specification, in which—

Figure 1 represents a longitudinal vertical section of my invention; Fig. 2, a plan or top view of the same.

Similar letters of reference in both views indicate corresponding parts.

This invention consists in the arrangement of a series of semicircular metallic troughs placed at certain distances apart, so as to leave spaces for the air to circulate in, and connected at their ends by similiar transverse troughs, in combination with pipes passing through the center of said troughs and leaving a clear channel all round in such a manner that if beer or other liquid is made to pass through the semicircular troughs and cold water through the pipes, the beer or other liquid is brought in contact with the cold sides of said water-pipes in thin strata, and, furthermore, the cold air is in contact all round with and passing through between the troughs, and thereby the cooling process is completed rapidly and with an apparatus of comparatively small dimensions.

To enable those skilled in the art to make and use my invention, I will proceed to describe it with reference to the drawings.

A A represents a series of semicircular troughs, made of sheet-copper or other suitable material and of equal length, their ends being connected by similar troughs, B, which extend at right angles to the troughs A, and which are closed at their ends, as clearly shown in Fig. 2 of the drawings. The troughs A are so arranged that they are separated from each other by spaces $a$, thereby allowing the air to circulate freely all round the same. The interior of the troughs A B is partially occupied by a series of pipes, C C', the pipes C' being connected at right angles to the pipes C, and the whole series being so arranged that they fit nicely in the troughs A B, each pipe being situated in the center, or nearly so, of one of the troughs and the diameter of said pipes as compared with that of the troughs is such that an open space, $b$, is left between the circumference of each pipe and the inner walls of the trough. The beer or other liquid to be cooled is introduced into one of the transverse troughs B through a perforated trough, D, and cold water is made to run through the pipes C C', being introduced through the supply-pipes $c$, and discharged through the pipes $c'$, the current of the cooling-liquid being in a direction against that of the liquid to be cooled. In passing through the troughs A B the beer or other liquid to be cooled is divided up in a number of small streams or thin tubular strata, being exposed on the inside to the sides of the pipes C C', which are kept cool by the cold water, or other liquid passing through them, and on the outside to the sides of the troughs, which are exposed all round to the influence of the atmospheric air, so that any heat which may be imparted to them is rapidly carried off by radiation. By these means the beer or other liquid is rapidly cooled while passing through troughs of a comparatively short length. Without the air-spaces $a$ between the troughs, and if said troughs are either separated simply by partitions, or if all the troughs are merged into one large trough, the material from which said trough is made is soon brought to the same temperature as the hot liquid and the process of cooling is effected very slow or only by the aid of a large and costly apparatus.

The application or use of the air-spaces $a$ between the troughs enables me to complete the process of cooling beer or other liquid in an apparatus much smaller, and consequently much cheaper, than an apparatus of the ordinary construction.

If desired, two or more of my apparatuses may be placed one on top of the other, and the beer or other liquid, after having passed through the upper or first apparatus, discharges into the second, and so on; and it is obvious that in this case the length of the several troughs can be materially reduced, and the whole apparatus can thus be accommodated to the room or space in which it is to be used.

Instead of the transverse troughs B, short elbow-connections might be used to connect the ends of the adjoining troughs A, and in this case the beer or other liquid would pass through the troughs in a zigzag or serpentine channel.

Having thus fully described my invention, what I claim as new, and desire to secure by Letters Patent, is—

The arrangement of the air-spaces $a$ between the troughs A, when the latter are used in combination with cold-water pipes C, substantially in the manner and for the purpose herein shown and described.

VALENTINE HAEFFNER.

Witnesses:
 TIMOTHY SHINE,
 M. S. PARTRIDGE.